United States Patent
Hwang

(10) Patent No.: US 7,221,716 B2
(45) Date of Patent: May 22, 2007

(54) SIGNAL RECEIVING APPARATUS AND METHOD ADAPTED FOR USE WITH A TIME-VARIANT CHANNEL

(75) Inventor: Chan-soo Hwang, Yongin (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 710 days.

(21) Appl. No.: 10/191,499

(22) Filed: Jul. 10, 2002

(65) Prior Publication Data

US 2003/0016765 A1     Jan. 23, 2003

(30) Foreign Application Priority Data

Jul. 11, 2001     (KR)     ................ 2001-41559

(51) Int. Cl.
*H03K 9/00*     (2006.01)
(52) U.S. Cl. ............... 375/316; 375/229; 375/232; 375/346
(58) Field of Classification Search ............... 375/316, 375/340, 346, 350, 229, 147, 384, 385, 232; 455/3.02, 130, 63.1, 296
See application file for complete search history.

(56) References Cited

U.S. PATENT DOCUMENTS

| | | | |
|---|---|---|---|
| 5,465,276 A | | 11/1995 | Larsson et al. |
| 5,727,032 A | * | 3/1998 | Jamal et al. ................ 375/347 |
| 6,151,484 A | * | 11/2000 | Ramesh ................ 455/68 |
| 6,389,295 B1 | * | 5/2002 | Ramesh ................ 455/517 |
| 6,680,967 B1 | * | 1/2004 | Westman ................ 375/148 |

FOREIGN PATENT DOCUMENTS

WO    WO 00 60762    10/2000

OTHER PUBLICATIONS

Xin et al.*, IEE Proc.-Control Theory Appl., 142(1):15-22 (Jan. 1995).
*Entitled: Optimal sampling interval for system identification based on decimation & interpolation.
Doherty et al.**, pp. 284-288 (© Oct. 15, 1989 IEEE) XP010083461.

(Continued)

*Primary Examiner*—Dac Ha
*Assistant Examiner*—Jaison Joseph
(74) *Attorney, Agent, or Firm*—Lee & Morse, P.C.

(57) ABSTRACT

In a communication system, an apparatus for receiving a signal transmitted through a channel having time-varying characteristics and for restoring original user information included in the received signal, preferably includes: a first channel characteristic estimator for estimating a signal representing the delay characteristic of the channel; a first channel characteristic predictor for decimating the estimated signal applied thereto, for predicting the characteristic values of the channel, for interpolating the predicted channel characteristic values, and for outputting the interpolated result as a first predictive characteristic signal; and a first receiver for generating a decision value from the first predictive characteristic signal and the received signal, restoring the transmitted signal using the estimated decision value, and outputting a restored transmitted signal, which is fed back to the first channel characteristic estimator.

22 Claims, 9 Drawing Sheets

OTHER PUBLICATIONS

**Entitled: "A New Method for Robust Fast Tracking Channel Equalization".
Itou, et al.***, Singapore ICCS/ISITA'92, Communications on the Move, pp. 755-759, © Nov. 16, 1992 IEEE.
***Entitled: IIR Adaptive Equalizer Using Channel Estimator.
Proakis, "Communication Through Band-Limited Linear Filter Channels", Digital Communications, Prentice Hall Press, pp. 583-602, (1995).

Bottomley, Gregory E., "Unification of MLSE Receivers And Extension To Time-Varying Channels", IEEE Transactions on Communications, vol. 46(4), pp. 464-472, (1998).
Haykins, "Adaptive Filter Theory", Prentice Hall Press, pp. 241-245, 302-333, 365-439, 562-587, (1996).
Proakis, "Digital-to-Analog Conversation" [Chapter 9, Sec. 9.3] Digital Signal Processing, Prentice Hall Press, pp. 765-774, (1996).

* cited by examiner

SIGNAL RECEIVING APPARATUS AND METHOD ADAPTED FOR USE WITH A TIME-VARIANT CHANNEL

BACKGROUND OF THE INVENTION

1. Field of the Invention

The present invention relates to signal reception in a communication system. More particularly, the present invention relates to a signal receiving apparatus and method adapted for use with a time-variant channel.

2. Description of the Related Art

In general, in a communication system including a transmitting side and a receiving side, the receiving side must know a current decision value of a signal received by the receiving side in order to estimate a characteristic of a channel. Herein, the decision value means transmission information restored. At this time, after an elapse of a certain training period of time, the use of the decision value obtains a channel estimate obtained by assuming the characteristic of a channel over which a transmitting signal has been transmitted.

In a case where a conventional signal receiving apparatus estimates the characteristic of a channel varying with time, a reduction in a time delay of the estimated channel characteristic requires a decrease in time spent in estimating the decision value. For this purpose, for example, in Maximum-Likelihood Sequence Estimation (hereinafter, referred to as "MLSE"), a tentative decision value determined with reducing a depth of a traceback is used. Herein, MLSE may also be called Maximum Likelihood Sequence Detection (MLSD), which is described in Proakis, "Digital Communications," Prentice Hall Press, pp. 583–602 (1995). However, since the tentative decision value has a high error rate, there has been a problem in that the characteristic of a channel estimated using the tentative decision value also has an increased error. Consequently, the above-mentioned conventional signal receiving apparatus has a disadvantage in that since there is a significant difference between the estimated characteristic of a channel and the real characteristic of a channel, a decision value used to restore user information cannot be estimated correctly from the estimated channel characteristic with an error.

To overcome this problem, another conventional signal receiving apparatus employs a linear predictor for estimating the characteristic of a time-delayed channel and predicting the characteristic of a current channel from the estimated characteristic of a delayed channel. Herein, the linear predictor can be embodied through a Wiener solution utilizing an autocorrelation of a channel, as is known to those skilled in the art. For the sake of simplicity of the solution, a method of linearly predicting the characteristic of a channel in which only a gradient of the channel is estimated and the channel is approximated with a linear function may be used. However, in the above-mentioned conventional signal receiving apparatus, there also arises a problem in that when the range of the characteristic of a channel to be predicted is long, the above-mentioned predictors cannot correctly predict the characteristic of a channel. Thus, the latter of two conventional signal receiving apparatuses, similar to the former mentioned above, also employs a tentative decision value, so that an error of the tentative decision value contributes to an incorrect restoration of user information.

SUMMARY OF THE INVENTION

In an effort to solve the above-described problems, it is a first feature of an embodiment of the present invention to provide a signal receiving apparatus adapted for use with a time-variant channel which can correctly estimate the characteristic of a time-delayed channel and correctly restore original user information using the estimated characteristic of the time-delayed channel.

It is another feature of an embodiment of the present invention to provide a signal receiving method performed in the signal receiving apparatus adapted for use with the time-variant channel.

According to one aspect of the present invention, there is provided a signal receiving apparatus adapted for use with a time-variant channel, the signal receiving apparatus which receives, as a received signal, a signal transmitted through the channel with a time-varying characteristic and which restores original user information from the received signal, including: a first channel characteristic estimator to estimate a first delay characteristic signal representing a delay characteristic of the channel from a restored transmitted signal and the received signal, and output the estimated first delay characteristic signal; a first channel characteristic predictor to decimate the estimated first delay characteristic signal input from the first channel characteristic estimator, predict the characteristic values of the channel from the decimated result of the first delay characteristic signal, interpolate the predicted channel characteristic values, and output the interpolated result of the channel characteristic values as a first predictive characteristic signal representing the predicted characteristic of the channel; and a first receiver adapted to estimate a decision value from the first predictive characteristic signal and the received signal, restore the transmitted signal from the estimated decision value, and output the restored transmitted signal to the first channel characteristic estimator, whereby the original user information is restored from the decision value. The first channel characteristic predictor may include: a first decimator to decimate the first delay characteristic signal input from the first channel characteristic estimator, and output the decimated result of the first delay characteristic signal; a first characteristic value predictor to predict the characteristic values of the channel from the decimated result of the first delay characteristic signal input from the first decimator, and output the predicted channel characteristic values; a first expander to insert a predetermined value between the predicted channel characteristic values input from the first characteristic value predictor, and output the inserted result; and a first interpolator to interpolate the inserted result input from the first expander, and output the interpolated result as the first predictive characteristic signal to the first receiver.

According to another aspect of the present invention, there is provided a method for receiving and restoring a transmitted signal in a signal receiving apparatus adapted for use with a time-variant channel, including: estimating a first delay characteristic signal using a received signal and a restored transmitted signal; decimating the estimated first delay characteristic signal, predicting characteristic values of the channel from the decimated result of the first delay characteristic signal and interpolating the predicted channel characteristic values to obtain a first predictive characteristic signal; estimating a decision value from the first predictive characteristic signal and the received signal, and restoring the transmitted signal from the estimated decision value; and repeating the foregoing steps until an accurate restored transmitted signal is obtained. The foregoing decimating step may include: decimating the estimated first delay characteristic signal; predicting the characteristic values of the channel from the decimated result of the first delay characteristic signal; inserting a predetermined value between the predicted characteristic values; and interpolating the inserted result to obtain the first predictive characteristic signal.

According to another aspect of the present invention, there is also provided a signal receiving apparatus adapted for use with a time-variant channel, the signal receiving apparatus which receives, as a received signal, a signal transmitted through the channel with a time-varying characteristic and restores original user information from the received signal, including: a second decimator to decimate a restored transmitted signal and output the decimated result of the restored signal; a third decimator to decimate the received signal and output the decimated result of the received signal; a second channel characteristic estimator to estimate a second delay characteristic signal representing the delay characteristic of the channel from the decimated results input from the second and third decimators, and output the estimated second delay characteristic signal; a second channel characteristic predictor to predict characteristic values of the channel from the second delay characteristic signal input from the second channel characteristic estimator, interpolate the predicted channel characteristic values, and output the interpolated result of the channel characteristic values as a second predictive characteristic signal representing the predicted characteristic of the channel; and a second receiver to estimate a decision value from the second predictive characteristic signal and the received signal, restore the transmitted signal from the estimated decision value, and output the restored transmitted signal to the second decimator, whereby the original user information is restored from the decision value. The second channel characteristic predictor may include: a second characteristic value predictor to predict the characteristic values of the channel from the second delay characteristic signal input from the second channel characteristic estimator, and output the predicted channel characteristic values; a second expander to insert a predetermined value between the predicted channel characteristic values input from the second characteristic value predictor, and output the inserted result; and a second interpolator to interpolate the inserted result input from the second expander, and output the interpolated result as the second predictive characteristic signal to the second receiver.

According to another aspect of the present invention, there is also provided a method for receiving and restoring a transmitted signal in a signal receiving apparatus adapted for use with a time-variant channel, including: decimating a restored transmitted signal and a received signal; estimating a second delay characteristic signal using the decimated results; predicting characteristic values of the channel from the estimated second delay characteristic signal and interpolating the predicted channel characteristic values to obtain the second predictive characteristic signal; and estimating the decision value from the second predictive characteristic signal and the received signal, and restoring the transmitted signal from the estimated decision value; and repeating the foregoing steps until an accurate restored transmitted signal is obtained. The foregoing predicting step may include: predicting characteristic values of the channel from the second delay characteristic signal estimate; inserting a predetermined value between the predicted characteristic values; and interpolating the inserted result to obtain the second predictive characteristic signal.

According to still another aspect of the present invention, there is also provided a signal receiving apparatus adapted for use with a time-variant channel, the signal receiving apparatus which receives, as a received signal, a signal transmitted through the channel with a time-varying characteristic and restores original user information from the received signal, including: a first transmitted signal regenerator to regenerate a transmitted signal restored from a restored user information and output the regenerated transmitted signal; a third channel characteristic estimator to estimate a third delay characteristic signal representing the delay characteristic of the channel from the regenerated transmitted signal input from the first transmitted signal regenerator and the received signal, and output the estimated third delay characteristic signal; a third channel characteristic predictor to decimate the third delay characteristic signal input from the third channel characteristic estimator, predict characteristic values of the channel from the decimated result of the third delay characteristic signal, interpolate the predicted channel characteristic values, and output the interpolated result of the channel characteristic values as a third predictive characteristic signal representing predicted characteristic of the channel; a third receiver to estimate a decision value from the third predictive characteristic signal input from the third channel characteristic predictor and the received signal and output the estimated decision value; and a first decoder to decode the estimated decision value input from the third receiver and output the decoded result as the restored user information obtained by restoring the original user information to the first transmitted signal regenerator. The third channel characteristic predictor may include: a fourth decimator to decimate the third delay characteristic signal input from the third channel characteristic estimator, and output the decimated result of the third delay characteristic signal; a third characteristic value predictor to predict characteristic values of the channel from the decimated result of the third delay characteristic signal input from the fourth decimator, and output the predicted channel characteristic values; a third expander to insert a predetermined value between the predicted channel characteristic values input from the third characteristic value predictor, and output the inserted result; and a third interpolator to interpolate the inserted result input from the third expander, and output the interpolated result as the third predictive characteristic signal to the third receiver.

According to still another aspect of the present invention, there is also provided a method for receiving and restoring a transmitted signal in a signal receiving apparatus adapted for use with a time-variant channel, including: regenerating a transmitted signal restored from a restored user information and obtaining a regenerated transmitted signal; estimating a third delay characteristic signal using the regenerated transmitted signal and the received signal; decimating the estimated third delay characteristic signal, predicting characteristic values of the channel from the decimated result of the third delay characteristic signal, interpolating a predicted channel characteristic values to obtain the third predictive characteristic signal; estimating a decision value from the third predictive characteristic signal and the received signal; decoding the estimated decision value; and repeating the foregoing steps until an accurate restored transmitted signal is obtained. The decimating step may include: decimating the estimated third delay characteristic signal; predicting characteristic values of the channel from the decimated result of the third delay characteristic signal; inserting a predetermined value between predicted characteristic values; and interpolating the inserted result to obtain the third predictive characteristic signal.

According to yet another aspect of the present invention, there is also provided a signal receiving apparatus adapted for use with a time-variant channel, the signal receiving apparatus which receives, as a received signal, a signal transmitted through the channel with a time-varying characteristic and restores original user information from the received signal, including: a second transmitted signal regenerator to regenerate a transmitted signal restored from restored user information and output the regenerated transmitted signal; a fifth decimator to decimate the regenerated transmitted signal input from the second transmitted signal regenerator and output the decimated result of the regenerated transmitted signal; a sixth decimator to decimate the received signal and output the decimated result of the received signal; a fourth channel characteristic estimator to estimate a fourth delay characteristic signal representing the delay characteristic of the channel from the decimated results input from the fifth and sixth decimators, and output the estimated fourth delay characteristic signal; a fourth channel characteristic predictor to predict characteristic values of the channel from the fourth delay characteristic signal input from the fourth channel characteristic estimator, interpolate the predicted channel characteristic values, and output the interpolated result of the channel characteristic values as a fourth predictive characteristic signal representing the predicted characteristic of the channel; a fourth receiver to estimate a decision value from the fourth predictive characteristic signal and the received signal, and output the estimated decision value; and a second decoder to decode the estimated decision value input from the fourth receiver and output the decoded result as the restored user information obtained by restoring the original user information to the second transmitted signal regenerator. The fourth channel characteristic predictor may include: a fourth characteristic value predictor to predict the characteristic values of the channel from the fourth delay characteristic signal input from the fourth channel characteristic estimator, and output the predicted channel characteristic values; a fourth expander to insert a predetermined value between the predicted channel characteristic values input from the fourth characteristic value predictor, and output the inserted result; and a fourth interpolator to interpolate the inserted result input from the fourth expander, and output the interpolated result as the fourth predictive characteristic signal to the fourth receiver.

According to still another aspect of the present invention, there is also provided a method for receiving and restoring a transmitted signal in a signal receiving apparatus adapted for use with a time-variant channel, including: regenerating a transmitted signal restored from a restored user information and obtaining a regenerated transmitted signal; decimating the regenerated transmitted signal and a received signal; estimating a fourth delay characteristic signal using the decimated results, predicting a characteristic value of the channel from the estimated fourth delay characteristic signal and interpolating a predicted channel characteristic value to obtain a fourth predictive characteristic signal; estimating a decision value from the fourth predictive characteristic signal and the received signal; decoding an estimated decision value to obtain the restored user information; and repeating the foregoing steps until an accurate restored transmitted signal is obtained. The predicting step may include: predicting the characteristic values of the channel from the fourth delay characteristic signal estimated above; inserting a predetermined value between the predicted characteristic values; and interpolating the inserted result to obtain the fourth predictive characteristic signal.

The characteristic of the channel in the foregoing features and embodiments may correspond to amplitude and/or phase. The first channel characteristic estimator may estimate the delay characteristic of the channel using a Least Mean Square (LMS) method, a Recursive Least Square (RLS) method, or a Kalman method.

BRIEF DESCRIPTION OF THE DRAWINGS

The above and other features and advantages of the present invention will become more apparent upon review of a detailed description of preferred embodiments thereof with reference to the attached drawings in which.

DETAILED DESCRIPTION OF THE INVENTION

Korean Patent Application No. 2001-41559, filed Jul. 11, 2001, and entitled: "Signal Receiving Apparatus and Method Adapted for use with Time-Variant Channel," is incorporated by reference herein in its entirety.

Hereinafter, a construction and operation of a general communication system to which a signal receiving apparatus adapted for use with a time-variant channel can be applied according to embodiments of the present invention will be described in detail with reference to FIG. 1.

Figure 1:
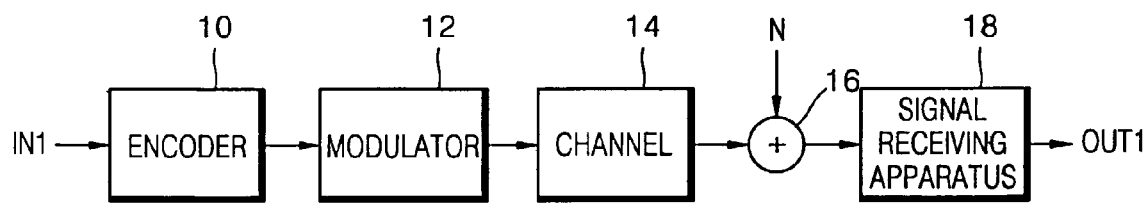
FIG. 1 illustrates a block diagram of a general communication system having a signal receiving apparatus adapted for use with a time-variant channel according to the present invention.

FIG. 1 illustrates a block diagram of a general communication system having a signal receiving apparatus adapted for use with a time-variant channel according to the present invention.

Referring to FIG. 1, a communication system preferably includes an encoder 10, a modulator 12, a channel 14, a synthesizer 16 and a signal receiving apparatus 18. Herein, the encoder 10 and the modulator 12 correspond to a transmitting side. The encoder 10 encodes original user information input through an input terminal IN1 and outputs an encoded result to the modulator 12. The modulator 12 modulates the encoded result and outputs a modulated transmission signal. The transmission signal output from the modulator 12 is transmitted through the channel 14 with a time-varying characteristic. The transmission signal transmitted through the channel 14 is synthesized with a noise N, and the synthesized result is sent to the signal receiving apparatus 18. More specifically, the synthesizer 16 synthesizes the modulated transmission signal that has passed through the channel 14 and is subjected to a noise N and outputs the synthesized result to the signal receiving apparatus 18. The signal receiving apparatus 18 receives the synthesized result, restores original user information in the received signal, and outputs the restored result through an output terminal OUT1.

A signal receiving apparatus 18 adapted for use with a time-variant channel according to each of the various embodiments of the present invention to be applied to a communication system shown in FIG. 1 and a signal receiving method of operation thereof will be described in detail with reference to the accompanying drawings.

Figure 2:
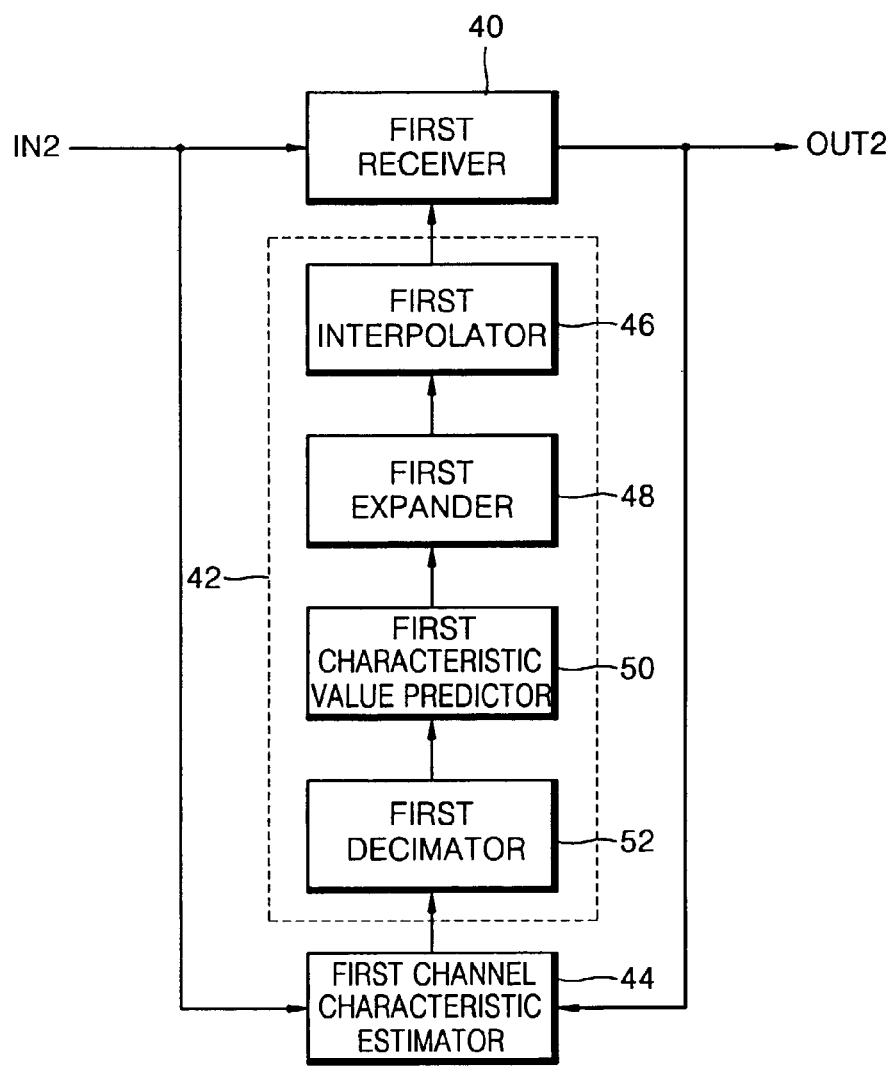
FIG. 2 illustrates a block diagram of a signal receiving apparatus adapted for use with a time-variant channel according to a first embodiment of the present invention.

FIG. 2 illustrates a block diagram of a signal receiving apparatus 18 adapted for use with a time-variant channel according to a first embodiment of the present invention.

Referring to the embodiment of FIG. 2, the signal receiving apparatus 18 preferably includes a first receiver 40, a first channel characteristic predictor 42 and a first channel characteristic estimator 44.

Figure 3:
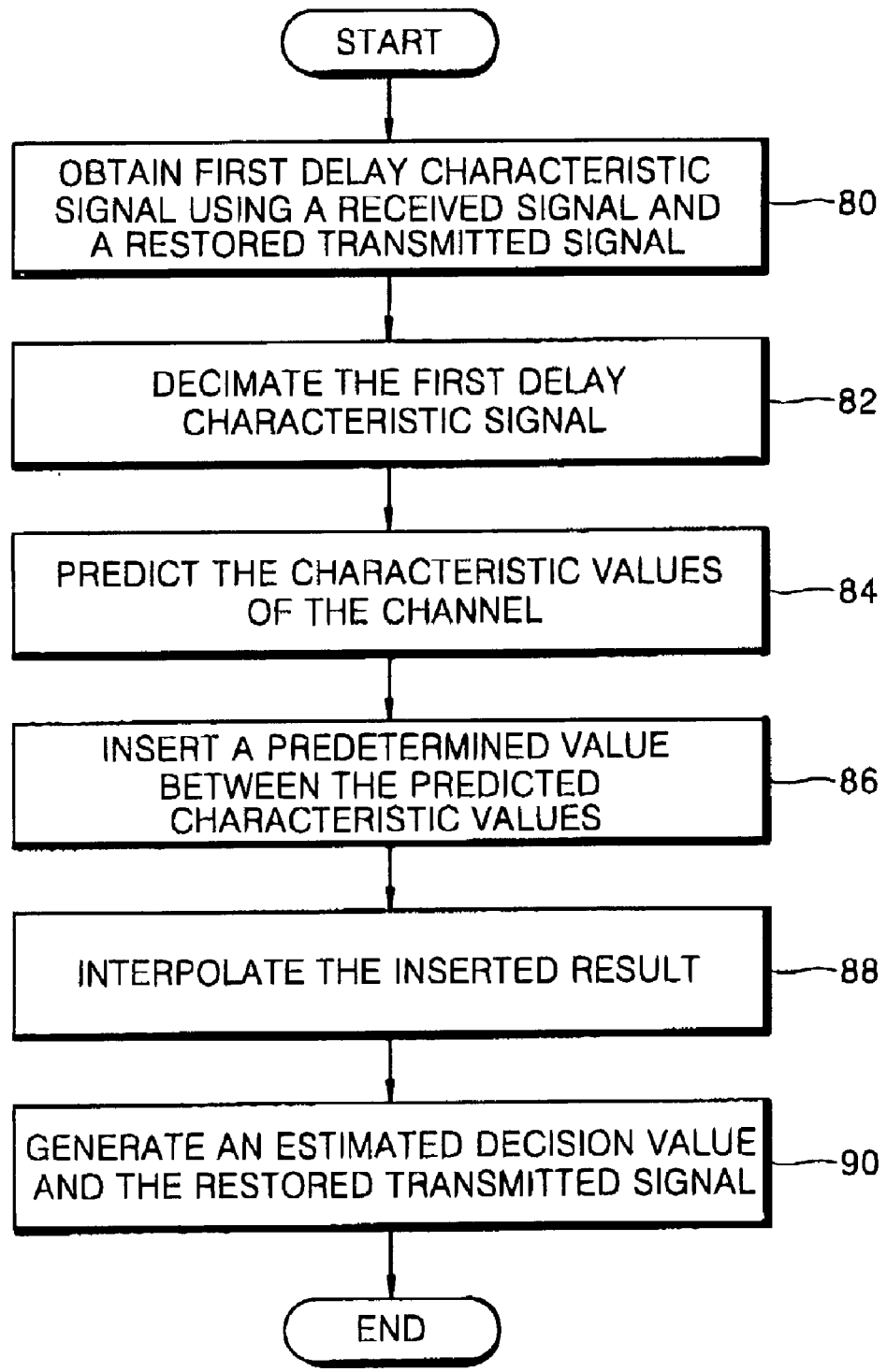
FIG. 3 illustrates a flowchart showing a signal receiving method according to the present invention to be implemented in the signal receiving apparatus shown in FIG. 2.

FIG. 3 illustrates a flowchart showing a signal receiving method according to the present invention to be implemented in the signal receiving apparatus 18 shown in FIG. 2, whereby the signal receiving method includes estimating the delay characteristic of a channel (step 80), predicting the characteristic of the channel (steps 82 through 88) and obtaining a decision value and a restored transmitted signal (step 90).

More specifically, in step 80, the first channel characteristic estimator 44 estimates a first delay characteristic signal representing the delay characteristic of the channel 14 using a restored transmitted signal output through an output terminal OUT2 of the first receiver 40 and a received signal input from the input terminal IN2 and outputs the estimated first delay characteristic signal to the first channel characteristic predictor 42. Herein, the characteristic of a channel means amplitude and/or phase of each tap in a channel.

First channel characteristic predictor 42 compensates for a time delay of the estimated channel characteristic by performing a decimation (i.e., undersampling) for the first delay characteristic signal input from the first channel characteristic estimator 44, predicts the characteristic values of the channel from the decimated result of the first delay characteristic signal, interpolates the predicted channel characteristic values, and outputs the interpolated result as a first predictive characteristic signal representing the predicted characteristic of the channel 14 to the first receiver 40 (steps 82 through 88).

To perform these operations, the first channel characteristic predictor 42 may be implemented with a first decimator 52, a first characteristic value predictor 50, a first expander 48 and a first interpolator 46. In step 82, the first decimator 52 preferably decimates the first delay characteristic signal input from the first channel characteristic estimator 44, and outputs the decimated result to the first characteristic value predictor 50. In step 84, the first characteristic value predictor 50 generates a prediction of the characteristic values of the channel 14 from the decimated result, and outputs the predicted channel characteristic values to the first expander 48. In step 86, the first expander 48 inserts a predetermined value, for example, "0" between the predicted channel characteristic values input from the first characteristic value predictor 50, and outputs the inserted result to the first interpolator 46. In step 88, the first interpolator 46 interpolates the inserted result input from the first expander 48, and outputs the interpolated result as a first predictive characteristic signal to the first receiver 40.

After step 88, the first receiver 40 generates an estimated decision value using the first predictive characteristic signal input from the first channel characteristic predictor 42 and the received signal input from the input terminal IN2, restores the transmitted signal using the estimated decision value, and outputs the restored transmitted signal to the first channel characteristic estimator 44 through the output terminal OUT2. The step of restoring the original user information may be accomplished by outputting the estimated decision value to, for example, a decoder (not shown), wherein the decoder decodes the estimated decision value generated in the first receiver 40 and outputs the decoded result as the original user information restored.

For example, assuming that the period of time required for estimating the decision value in the first receiver 40 is $\tau$, and signals are input/output to/from each of the constituent elements 40, 42 and 44 shown in FIG. 2 at time t, the first channel characteristic predictor 42 generates the first predictive characteristic signal using the received signal applied to the first channel characteristic estimator 44 from the input terminal IN2 at time $t-\tau-1$ and the restored transmitted signal corresponding to the transmitted signal output from the modulator 12 at time $t-\tau-1$. At this time, the first predictive characteristic signal exhibits the predicted characteristic of the channel 14 through which the transmitted signal passes at time t. Through the use of the first predictive characteristic signal and the received signal input through the input terminal IN2 at time t, the first receiver 40 obtains the restored transmitted signal which was previously outputted from the modulator 12 at time $t-\tau$.

Figure 4:
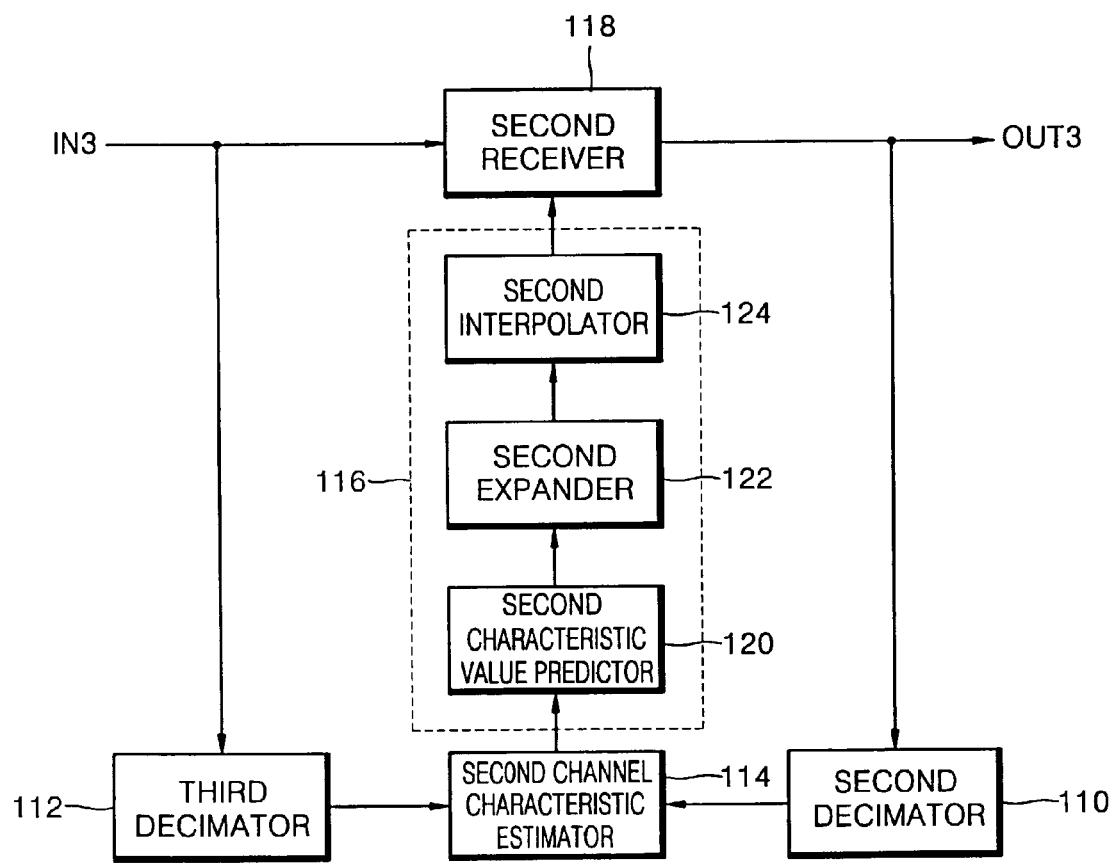
FIG. 4 illustrates a block diagram of a signal receiving apparatus adapted for use with a time-variant channel according to a second embodiment of the present invention.

FIG. 4 illustrates a block diagram showing a signal receiving apparatus 18 adapted for use with a time-variant channel according to a second embodiment of the present invention.

Referring to FIG. 4, the signal receiving apparatus 18 preferably includes a second channel characteristic estimator 114, a second and third decimators 110 and 112, a second channel characteristic predictor 116 and a second receiver 118.

Figure 5:
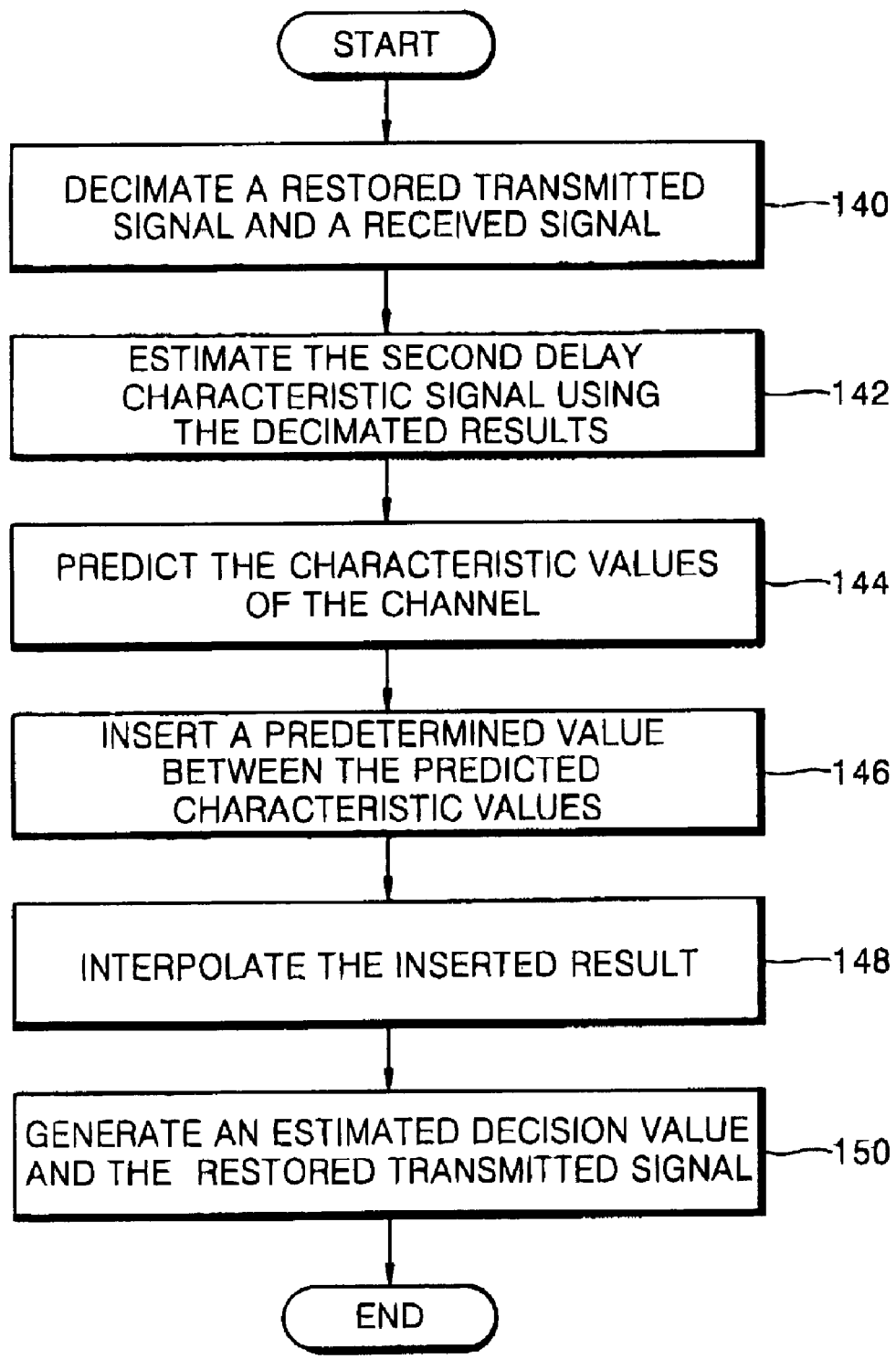
FIG. 5 illustrates a flowchart showing a signal receiving method of the present invention to be implemented in the signal receiving apparatus shown in FIG. 4.

FIG. 5 illustrates a flowchart showing a signal receiving method of the present invention to be implemented in the signal receiving apparatus 18 shown in FIG. 4, whereby the signal receiving method includes decimating both the restored transmitted signal and the received signal (step 140), estimating the delay characteristic of a channel (step 142), predicting the characteristic values of the channel (steps 144 through 148) and obtaining a decision value and a restored transmitted signal (step 150).

Unlike the signal receiving apparatus 18 of the first embodiment shown in FIG. 2, the signal receiving apparatus 18 of the second embodiment shown in FIG. 4 performs a decimation operation just prior to the estimation of the delay characteristic of the channel, rather than after the estimation. Except for this change, the signal receiving apparatus 18 shown in FIG. 4 and the associated signal receiving method shown in FIG. 5 are identical to those as shown in FIGS. 2 and 3.

In a first step 140, shown in FIG. 5, the restored transmitted signal and the received signal are decimated. The second decimator 110 decimates the restored transmitted signal from the second receiver 118 (i.e., at output terminal OUT3) and outputs a decimated result of the restored signal to a first terminal of the second channel characteristic estimator 114. The third decimator 112 decimates a received signal input from the input terminal IN3 and outputs the decimated result of the received signal to a second terminal of the second channel characteristic estimator 114.

In step 142, the second channel characteristic estimator 114 estimates a second delay characteristic signal representing the delay characteristic of the channel 14 from the decimated results input from the second and third decimators 110 and 112, respectively, and outputs the estimated second delay characteristic signal to the second channel characteristic predictor 116.

In steps 144 through 148, the second channel characteristic predictor 116 compensates for a time delay of the estimated channel characteristic by predicting the characteristic values of the channel 14 from the second delay characteristic signal input from the second channel characteristic estimator 114, interpolates the predicted channel characteristic values, and outputs the interpolated result as a second predictive characteristic signal representing the predicted characteristic of the channel 14 to the second receiver 118.

To perform these operations, the second channel characteristic predictor 116 may be implemented with a second characteristic value predictor 120, a second expander 122 and a second interpolator 124. In step 144, the second characteristic value predictor 120 predicts the characteristic values of the channel 14 from the second delay characteristic signal input from the second channel characteristic estimator 114, and outputs the predicted channel characteristic values to the second expander 122. In step 146, the second expander 122 preferably inserts a predetermined value, for example, "0," between predicted channel characteristic values input from the second characteristic value predictor 120 and outputs the inserted result to the second interpolator 124. In step 148, the second interpolator 124 interpolates the inserted result input from the second expander 122, and outputs the interpolated result as a second predictive characteristic signal to the second receiver 118.

After step 148, the second receiver 118 generates an estimated decision value using the second predictive characteristic signal input from the second channel characteristic predictor 116 and the received signal input from the input terminal IN3, restores the transmitted signal using the estimated decision value, and outputs the restored transmitted signal to the second decimator 110 through the output terminal OUT3. The step of restoring the original user information may be accomplished by outputting the estimated decision value to, for example, a decoder (not shown), wherein the decoder decodes the estimated decision value generated in second receiver 118, and outputs the decoded result as the original user information restored.

In order to improve the accuracy of the decision value estimates produced using the aforementioned apparatus and methods, a transmission signal that is regenerated from the restored user information may be employed, rather than using the restored transmission signal output from the first or second receivers 40 or 118, respectively, to estimate the delay characteristic of a channel.

Figure 6:
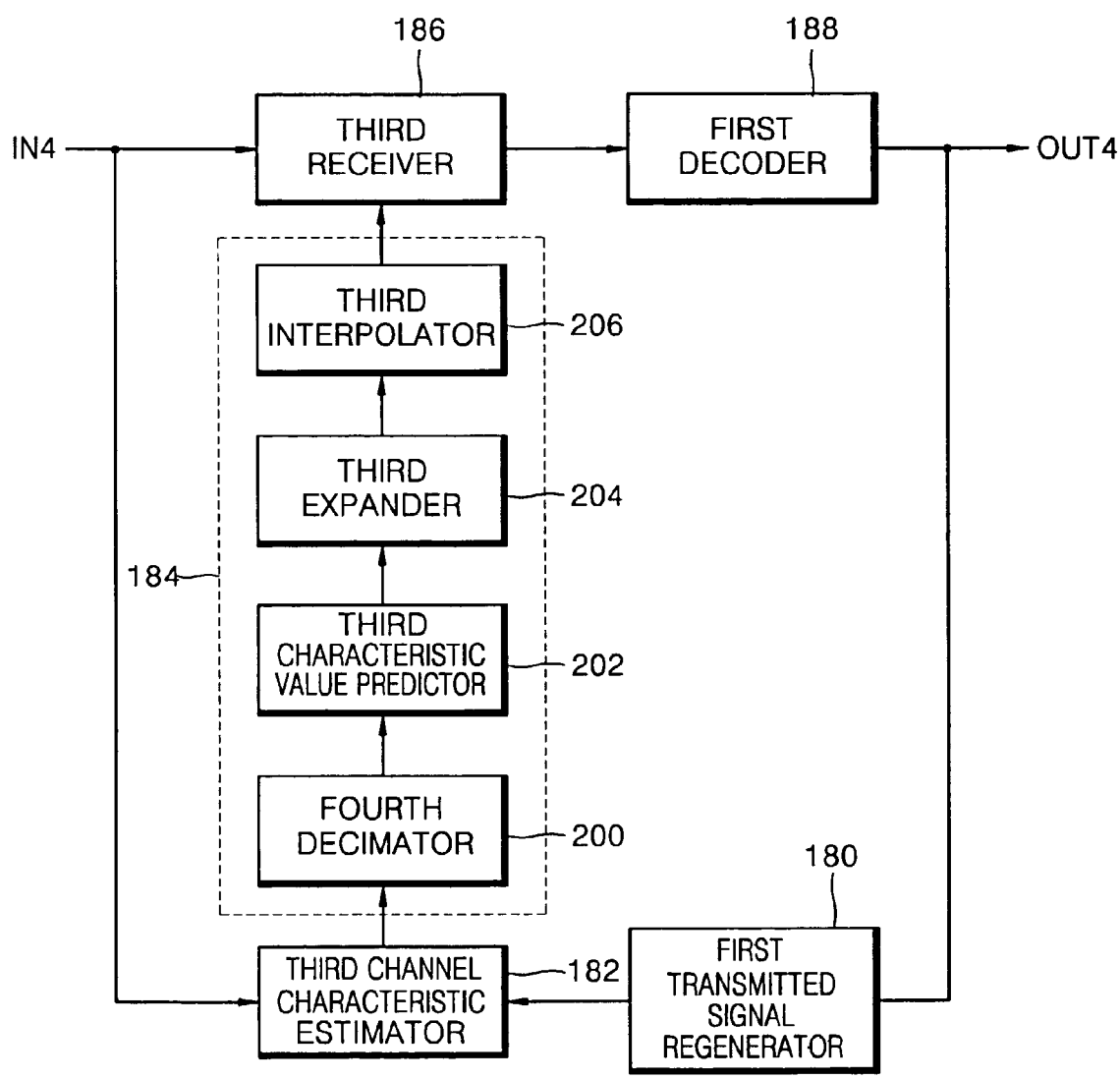
FIG. 6 illustrates a block diagram of a signal receiving apparatus adapted for use with a time-variant channel according to a third embodiment of the present invention.

FIG. 6 illustrates a block diagram of a signal receiving apparatus 18 adapted for use with a time-variant channel according to a third embodiment of the present invention.

Referring to FIG. 6, the signal receiving apparatus 18 preferably includes a first transmitted signal regenerator 180, a third channel characteristic estimator 182, a third channel characteristic predictor 184, a third receiver 118 and a first decoder 188.

Figure 7:
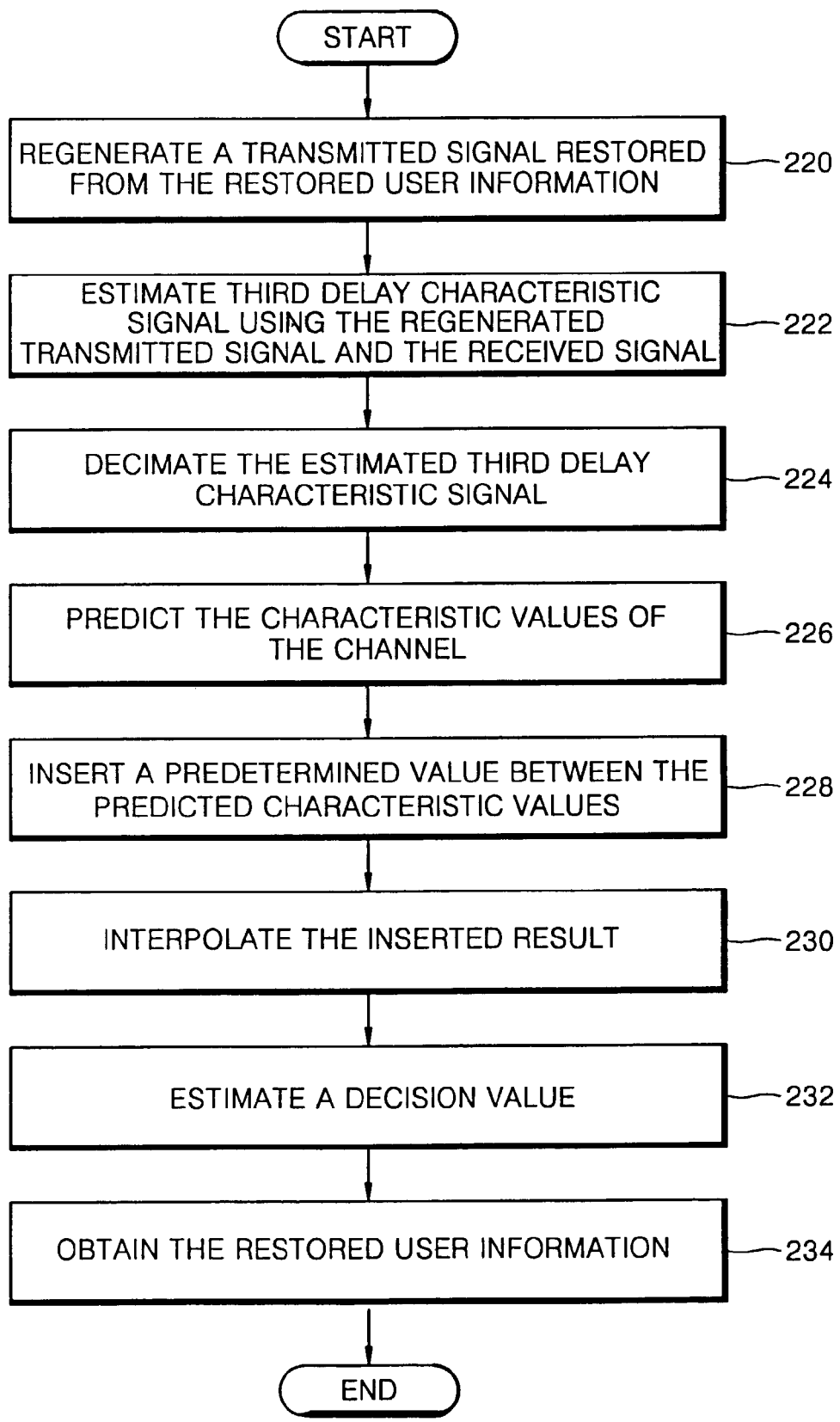
FIG. 7 illustrates a flowchart showing a signal receiving method of the present invention to be implemented in the signal receiving apparatus shown in FIG. 6.

FIG. 7 illustrates a flowchart showing a signal receiving method of the present invention to be implemented in the signal receiving apparatus 18 shown in FIG. 6, wherein the signal receiving method includes regenerating a restored transmitted signal from restored user information in step 220, estimating the delay characteristic of a channel (steps 220 and 222), predicting the characteristic of the channel (steps 224 through 230) and estimating a decision value (step 232) and obtaining the restored user information (step 234).

The signal receiving apparatus 18 of the third embodiment shown in FIG. 6 and the associated signal receiving method shown in FIG. 7 are identical to the signal receiving apparatus 18 and the associated method of the first embodiment shown in FIGS. 2 and 3, respectively, except that a transmitted signal regenerated from the restored user information output from the first decoder 188 is employed to estimate the delay characteristic of the channel, rather than employing the restored transmitted signal output directly from the first or second receiver 40.

Referring to FIGS. 6 and 7, in step 220, the first transmitted signal regenerator 180 preferably regenerates a restored transmission signal from the restored user information output from the first decoder 188 and outputs the regenerated transmission signal to the third channel characteristic estimator 182. For this purpose, the first transmitted signal regenerator 180 may be implemented with an encoder (not shown) and a modulator (not shown). Herein, the encoder encodes the restored user information and outputs the encoded result to the modulator. The modulator modulates the encoded result input from the encoder in a same manner as the modulator 12 shown in FIG. 1 and outputs the modulated result as a regenerated transmitted signal to the third channel characteristic estimator 182.

In step 222, the third channel characteristic estimator 182 estimates a third delay characteristic signal representing the delay characteristic of the channel 14 using the regenerated transmitted signal input from the first transmitted signal regenerator 180 and the received signal input through an input terminal IN4, and outputs the estimated third delay characteristic signal to the third channel characteristic predictor 184.

In steps 224 through 230, the third channel characteristic predictor 184 decimates the third delay characteristic signal input from the third channel characteristic estimator 182, predicts the characteristic values of the channel 14 from the decimated result, interpolates the predicted channel characteristic values, and outputs the interpolated result as a third predictive characteristic signal representing the predicted characteristic of the channel 14 to the third receiver 186.

To perform these operations, the third channel characteristic predictor 184 may be implemented with a fourth decimator 200, a third characteristic value predictor 202, a third expander 204 and a third interpolator 206. In step 224, the fourth decimator 200 decimates the third delay characteristic signal input from the third channel characteristic estimator 182 and outputs the decimated result to the third characteristic value predictor 202. In step 226, the third characteristic value predictor 202 predicts the characteristic values of the channel 14 from the decimated result and outputs the predicted channel characteristic values to the third expander 204. In step 228, the third expander 204 preferably inserts a predetermined value, for example, "0," between predicted channel characteristic values input from the third characteristic value predictor 202 and outputs the inserted result to the third interpolator 206. In step 230, the third interpolator 206 interpolates the inserted result input from the third expander 204 and outputs the interpolated result as a third predictive characteristic signal to the third receiver 186.

In step 232, the third receiver 186 generates a decision value from the third predictive characteristic signal input from the third channel characteristic predictor 184 and the received signal input from the input terminal IN4 and outputs the generated decision value to the first decoder 188. In step 234, the first decoder 188 decodes the generated decision value input from the third receiver 186 and outputs the decoded result as the restored user information to the first transmitted signal regenerator 180 and output terminal OUT4. For example, the first decoder 188 preferably compensates for any errors contained in the generated decision value output from the third receiver 186 to more correctly restore the original user information.

Figure 8:
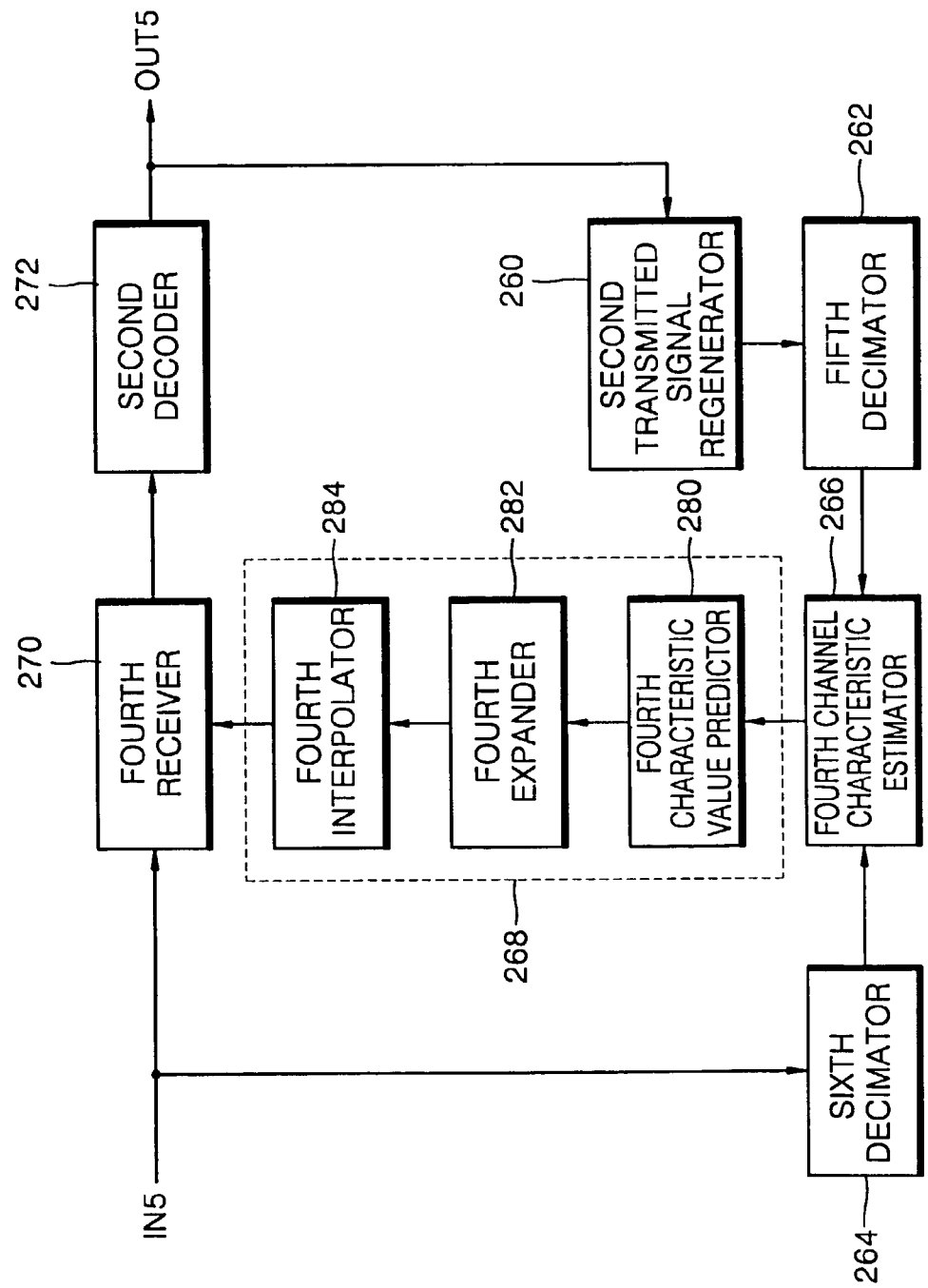
FIG. 8 illustrates a block diagram of a signal receiving apparatus adapted for use with a time-variant channel according to a fourth embodiment of the present invention.

FIG. 8 illustrates a block diagram of a signal receiving apparatus 18 adapted for use with a time-variant channel according to a fourth embodiment of the present invention.

Referring to FIG. 8, the signal receiving apparatus 18 includes a second transmitted signal regenerator 260, a fifth and sixth decimators 262 and 264, respectively, a fourth channel characteristic estimator 266, a fourth channel characteristic predictor 268, a fourth receiver 270 and a second decoder 272.

Figure 9:
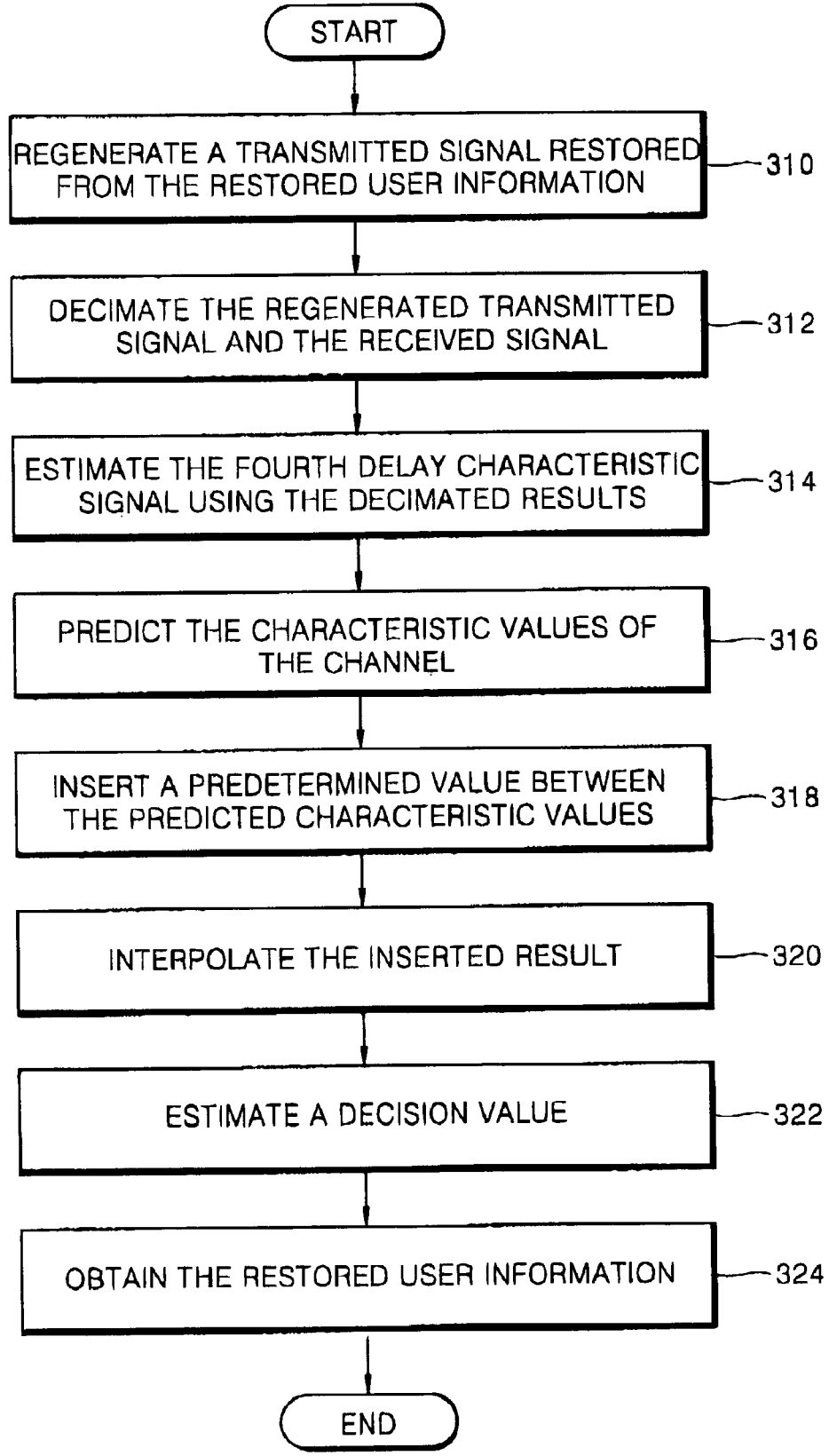
FIG. 9 illustrates a flowchart showing a signal receiving method according to the present invention to be implemented in the signal receiving apparatus shown in FIG. 8.

FIG. 9 illustrates a flowchart showing a signal receiving method of the present invention to be implemented in the signal receiving apparatus 18 shown in FIG. 8, wherein the signal receiving method includes regenerating a restored transmitted signal from restored user information in step 310, estimating the delay characteristic of a channel (steps 312 and 314), predicting the characteristic values of the channel (steps 316 through 320) and obtaining a decision value and restored user information (steps 322 and 324).

Unlike the signal receiving apparatus shown in FIG. 6, the signal receiving apparatus 18 shown in FIG. 8 does not perform a decimation operation when predicting the characteristic of the channel, but performs it just prior to the estimation of the delay characteristic of the channel. Except for this, the signal receiving apparatus 18 shown in FIG. 8 and the signal receiving method shown in FIG. 9 to be implemented in the signal receiving apparatus 18 are identical to those as shown in FIGS. 6 and 7.

In a first step 310, the second transmitted signal regenerator 260 regenerates a transmission signal, which is restored using the restored user information output from the second decoder 272, and outputs the regenerated transmitted signal to the fifth decimator 262. For this purpose, the second transmitted signal regenerator 260 preferably has the same architecture and operation as those of the first transmitted signal regenerator 180 shown in FIG. 6. That is, the second transmitted signal regenerator 260 may be implemented with the encoder (not shown) and the modulator (not shown) as mentioned above. For example, in the case where the modulator 12 shown in FIG. 1 modulates the transmitted information in a binary phase shift keying (BPSK) scheme, the modulator (not shown) included in the first or second transmitted signal regenerator (180 or 260) regenerates the restored transmitted signal from the restored user information, in a BPSK scheme.

After step 310, in step 312, the regenerated transmitted signal and the received signal are decimated. For this purpose, the fifth decimator 262 decimates the regenerated transmitted signal inputted from the second transmitted signal regenerator 260 and outputs the decimated result of the regenerated transmitted signal to the fourth channel characteristic estimator 266. Also, the sixth decimator 264 decimates the received signal input from the input terminal IN5 and outputs the decimated result of the received signal to the fourth channel characteristic estimator 266.

In step 314, the fourth channel characteristic estimator 266 estimates a fourth delay characteristic signal representing the delay characteristic of the channel 14 from the decimated results input from the fifth and sixth decimators 262 and 264, respectively, and outputs the estimated fourth delay characteristic signal to the fourth channel characteristic predictor 268.

In steps 316 through 320, the fourth channel characteristic predictor 268 predicts the characteristic values of the channel 14 from the fourth delay characteristic signal, interpolates the predicted channel characteristic values, and outputs the interpolated result of the channel characteristic values as a fourth predictive characteristic signal representing the predicted characteristic of the channel 14 to the fourth receiver 270.

To perform these operations, the fourth channel characteristic predictor 268 may be implemented with a fourth characteristic value predictor 280, a fourth expander 282 and a fourth interpolator 284. Herein, after step 314, in step 316, the fourth characteristic value predictor 280 predicts the characteristic values of the channel 14 from the fourth delay characteristic signal input from the fourth channel characteristic estimator 266 and outputs the predicted channel characteristic values to the fourth expander 282. In step 318, the fourth expander 282 inserts a predetermined value, for example, "0" between predicted channel characteristic values input from the fourth characteristic value predictor 280, and outputs the inserted result to the fourth interpolator 284. In step 320, the fourth interpolator 284 interpolates the inserted result and outputs the interpolated result as a fourth predictive characteristic signal to the fourth receiver 270.

In step 322, the fourth receiver 270 generates a decision value from the fourth predictive characteristic signal input from the fourth channel characteristic predictor 268 and the received signal input from the input terminal IN5 and outputs the generated decision value to the second decoder 272. In step 324, the second decoder 272 decodes the generated decision value and outputs the decoded result as the restored user information obtained by restoring the original user information to the second transmitted signal regenerator 260 while outputting it through an output terminal OUT5. For this purpose, the second decoder 272 may be implemented with a decoder (not shown) for decoding the decision value input from the fourth receiver 270 and outputting the decoded result as the restored user information. For example, the second decoder 272 preferably compensates for any errors contained in the generated decision value output from the fourth receiver 270 to more correctly restore the original user information.

When the transmitted signal restored in the first or second receiver 40 or 118 shown in FIG. 2 or FIG. 4 is erroneously estimated so that it has an error, the first or second predictive characteristic signal generated from the first or second channel characteristic predictor 42 or 116 may also have an error. To overcome this problem, as shown in FIG. 6 or FIG. 8, the restored user information may be employed instead of the restored transmitted signal, to estimate the delay characteristic of the channel used to predict the characteristic of the channel.

To provide a better understanding of the present invention, an exemplary operation of each of the constituent elements of the signal receiving apparatus adapted for use with a time-variant channel according to the embodiments of the present invention shown in FIGS. 2, 4, 6 and 8 will be described in detail hereinafter.

First, assuming that the length of the channel 14 is M, and the received signal $y_k$ is given by the equation $$y_k = h^H_k X_k + n_k \quad [1]$$

where k denotes time, $n_k$ denotes a noise, $h^H_k$ denotes an impulse response of the channel 14, in which $h_k$ can be written as the equation, $$h_{k=[hk,o},h_{k,1} \ldots h_{k,M}]^T \quad [2]$$

and $x_k$ as the transmitted signal can be written as the equation $$X_k = [X_k X_{k-1} \ldots X_{k-M}]^T \quad [3]$$

where T denotes a transpose.

At this time, each of the first, second, third and fourth channel characteristic estimators 44, 114, 182 and 266, respectively, can estimate the delay characteristic of the channel using, for example, Least Mean Squares (LMS) method, Recursive Least Squares (RLS) method or a Kalman method. All these methods estimate a channel with minimized error ($e_k$). Herein, the error ($e_k$) is given by the equation $$e_k = y_k - \hat{h}^H_{k-1} x^H_k \quad [4]$$

where, assuming that the time taken to estimate a decision value in the first, second, third or fourth receiver 40, 118, 186 or 270, respectively, is D (herein, D is identical to the above-mentioned τ), equation [4] can be written as $$e_{k-D} = y_{k-D} - \hat{h}^H_{k-1-D} x^H_{k-D} \quad [5]$$

Using a delayed error ($e_k$) as defined in [Equation 5], the characteristic of the channel, that is, amplitude and/or phase are/is estimated. Thus, the first, second, third or fourth delay characteristic signal estimated using the delayed error ($e_k$) corresponds to $h_{k-D}$. The above-mentioned LMS, RLS and Kalman methods are described in Haykins, "Adaptive Filter Theory," Prentice Hall Press, pp. 365–439, pp. 562–587 and pp. 302–334 (1996), respectively.

At this time, the first or fourth decimator 52 or 200, respectively, selects one characteristic value every L period from the characteristic values of the first or third delay characteristic signal input from the first or third channel characteristic estimator 44 or 182, respectively, and outputs the selected characteristic value to the first or third characteristic value predictor 50 or 202, respectively. The third or sixth decimator 112 or 264, respectively, selects one characteristic value every L period from the characteristic values of the received signal input from the input terminal IN3 or IN5, and outputs the selected characteristic value to the second or fourth channel characteristic estimator 114 or 266, respectively. Also, the second or fifth decimator 110 or 262, respectively, selects one characteristic value every L period from the characteristic values of the restored or regenerated transmitted signal input from the second receiver 118 or the second transmitted signal regenerator 260, and outputs the selected characteristic value to the second or fourth channel characteristic estimator 114 or 266, respectively.

At this time, the first, second, third or fourth characteristic value predictor 50, 120, 202 or 280, respectively, obtains first, second, third or fourth predictive characteristic signal $\hat{h}_k$, respectively, which is given by the following equation [6] using a linear prediction method from the estimated first, second, third or fourth delay characteristic signal:

$$\hat{h}_k = \sum_{i=1}^{N} W_i \hat{h}_{k-iL} \quad [6]$$

where $W_i$ is a weighted value, which can be written as $$W_i = \begin{bmatrix} w_{i,1} & 0 & \ldots & 0 \\ 0 & w_{i,2} & \ldots & 0 \\ \vdots & \vdots & \vdots & \vdots \\ 0 & \ldots & 0 & w_{i,M} \end{bmatrix} \quad [7]$$

where Wi=[w1, J, . . . , wN, J] can be obtained using a Wiener-Hopf equation defined by the equation $$R_j W_j = p_j \quad [8]$$

where $R_j$ denotes an autocorrelation matrix, which is given by the equation $$R_j = \begin{bmatrix} r_j(0) & r_j(1) & \ldots & r_j(N-1) \\ r^*_j(1) & r_j(0) & \ldots & r_j(N-2) \\ \vdots & \vdots & \vdots & \vdots \\ r^*_j(N-1) & \ldots & r^*_j(1) & r_j(0) \end{bmatrix} \quad [9]$$

where $w_j$ denotes a weighted vector, and $p_j$ denotes a cross-correlation vector, which is given by the equation:

$$p_j = [r_j(1) \ldots r_j(N)] \quad [10]$$

where $r_j(i)$ is given by the equation $$r_j(i) = E[h_{k,j} h_{k-Li,j}] \quad [11]$$

where E[ ] denotes an expectation value. The above-mentioned linear prediction method and Wiener-Hopf equation are described in Haykins, "Adaptive Filter Theory," at pp. 241–245.

Similarly, the characteristic values predicted by the first, second, third or fourth characteristic value predictor 50, 120, 202 or 280, respectively, is output to the first, second, third or fourth expander 48, 122, 204 or 282, respectively, which inserts a predetermined value of "0" between the predicted characteristic values, and outputs the inserted result to the first, second, third or fourth interpolator 46, 124, 206 or 284, respectively. The first, second, third or fourth interpolator 46, 124, 206 or 284, respectively, interpolates the inserted result input from the first, second, third or fourth expander 48, 122, 204 or 282, respectively, using, for example, a linear interpolation method such as a raised cosine interpolate technique, and outputs the interpolated result as the first, second, third or fourth predictive characteristic signal to the first, second, third or fourth receiver 40, 118, 186 and 270, respectively, Herein, various interpolation methods for interpolating the inserted result that may be applied to the first, second, third or fourth interpolator 46, 124, 206 or 284, respectively, from the first, second, third or fourth expander 48, 122, 204 or 282, respectively, are described in Proakis, "Digital Signal Processing," Prentice Hall Press, pp. 765–774 (1996).

Meanwhile, the first or second receiver 40 or 118, respectively, shown in FIG. 2 or 4 has the delay time D to estimate the decision value, whereas the third or fourth receiver 186 or 270 shown in FIG. 6 or 8 may or may not have the delay time D to estimate the decision value. Also, unlike the signal receiving apparatus 18 shown in FIG. 2 or 6, the signal receiving apparatus 18 shown in FIG. 4 or 8 performs a decimation operation prior to the estimation of the delay characteristic of the channel. Therefore, the second or fourth channel characteristic estimator 114 or 266, respectively, may have less amount of computation to estimate the delay characteristic of the channel compared with the first or third channel characteristic estimator 44 or 182, respectively, which results in a minimization of the apparatus and a reduction in power consumption.

For a better understanding of the present invention, when assuming that a symbol rate is 25 Ksps (symbol per second), a carrier frequency $f_c$ is 900 MHz, the size of frames or the number of items of transmitted information is 100 (symbols), a unit frame consists of 10 transmitted information already well-known to a transmitting side and a signal receiving apparatus and 90 transmitted information not well-known, the tap number of the channel 14 is 2, the channel 14 is a rayleigh fading channel, N is an Additive White Gaussian Noise (AWGN), the delay characteristic of the channel is estimated by the LMS method having the size of step ranging from 0.1 to 0.5, D=50(symbols), the modulator 12 performs a modulation using the BPSK scheme, L=50, a conventional signal receiving apparatus has the delay time of 2–4(symbols) so that a receiving side thereof obtains a decision value, the comparison between the signal receiving apparatus and method according to the present invention and the signal receiving apparatus and method according to the prior art will be made hereinafter.

Figure 10:
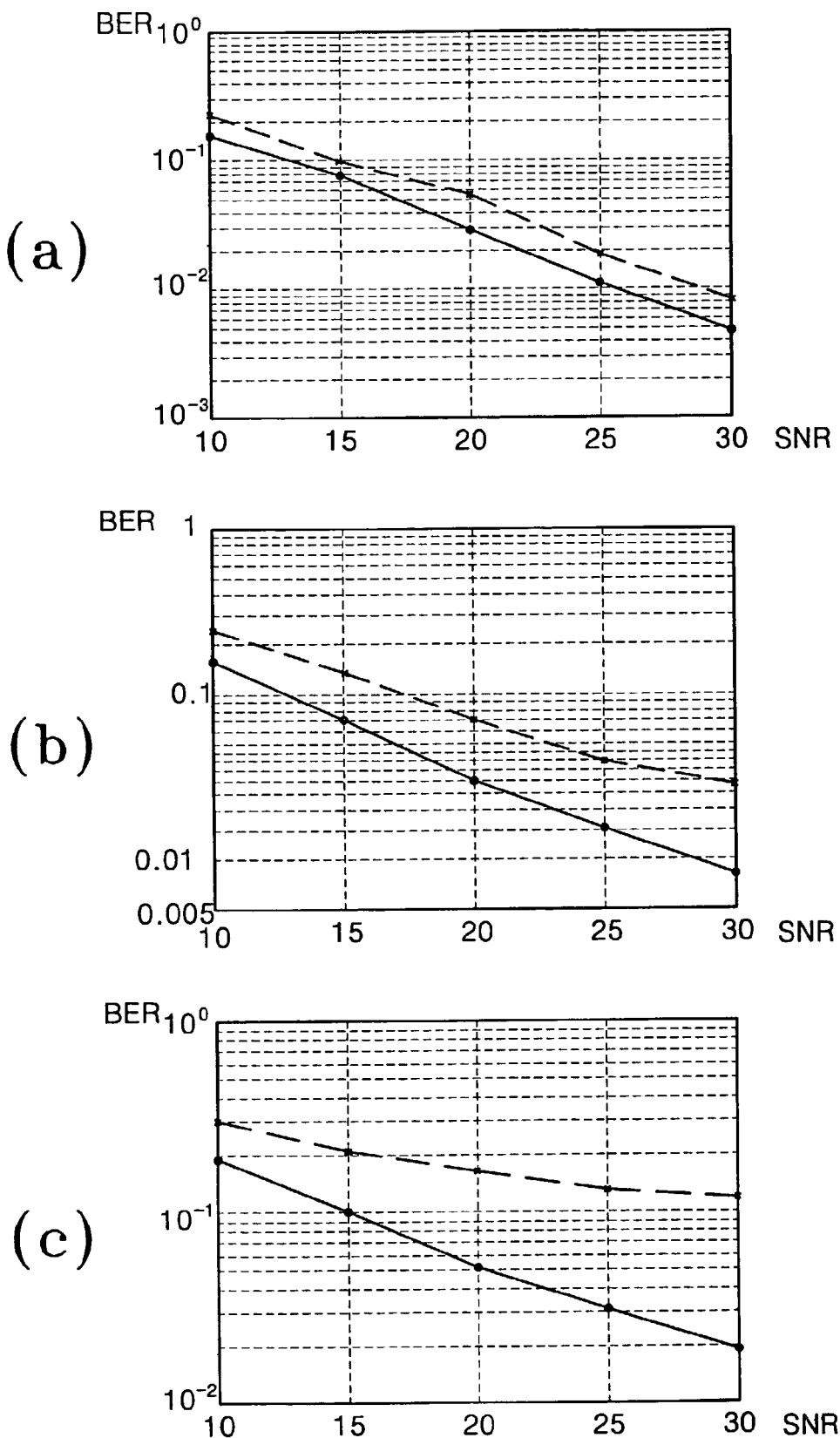
FIGS. 10(a) to 10(c) illustrate graphs comparing the characteristics of the signal receiving apparatus and method according to the present invention with a conventional signal receiving apparatus and method.

FIGS. 10(a) to 10(c) illustrate graphs comparing the characteristics of the signal receiving apparatus and method according to the present invention with a conventional signal receiving apparatus and method.

Referring to FIGS. 10(a) to 10(c), a horizontal axis of each graph represents Signal-to-Noise Ratio (SNR), and a vertical axis thereof represents Bit Error Rate (BER). Also, a maximum Doppler frequency ($f_d$) is 50 Hz in FIG. 10(a), $f_d$ is 100 Hz in FIG. 10(b), and $f_d$ is 200 Hz in FIG. 10(c). Further, a dotted line of the graph denotes a signal receiving method according to the prior art and a solid line thereof denotes a signal receiving method according to the present invention, respectively.

A variation of the channel in FIG. 10(a) is slower than that in FIG. 10(b), whereas a variation of the channel In FIG. 10(c) is faster than that in FIG. 10(b). Therefore, it may be seen that as a variation of the channel becomes faster, the signal receiving method according to the present invention has BER smaller than that of conventional implementations.

Accordingly, the present invention has an improved ability in restoring user information than the prior art.

As described above, the signal receiving apparatus and method adapted for use with a time-variant channel according to the present invention has an advantage that a correct prediction of the characteristic of the channel allows a more accurate restoration of original user information, and there is no need to obtain a tentative decision value, thus producing a reduction in manufacturing cost along with achievement of a simpler hardware implementation.

Preferred embodiments of the present invention have been disclosed herein and, although specific terms are employed, they are used in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A signal receiving apparatus adapted for use with a time-variant channel, the signal receiving apparatus which receives, as a received signal, a signal transmitted through the channel with a time-varying characteristic and which restores original user information from the received signal, comprising:

a first channel characteristic estimator to estimate a first delay characteristic signal representing a delay characteristic of the channel from a restored transmitted signal and the received signal, and output the estimated first delay characteristic signal;

a first channel characteristic predictor to decimate the estimated first delay characteristic signal input from the first channel characteristic estimator, predict the characteristic values of the channel from the decimated result of the first delay characteristic signal, interpolate the predicted channel characteristic values, and output the interpolated result of the channel characteristic values as a first predictive characteristic signal representing the predicted characteristic of the channel; and a first receiver adapted to estimate a decision value from the first predictive characteristic signal and the received signal, restore the transmitted signal from the estimated decision value, and output the restored transmitted signal to the first channel characteristic estimator, whereby the original user information is restored from the decision value.

2. The signal receiving apparatus as claimed claim 1, wherein the first channel characteristic predictor comprises:

a first decimator to decimate the first delay characteristic signal input from the first channel characteristic estimator, and output the decimated result of the first delay characteristic signal;

a first characteristic value predictor to predict the characteristic values of the channel from the decimated result of the first delay characteristic signal input from the first decimator, and output the predicted channel characteristic values;

a first expander to insert a predetermined value between the predicted channel characteristic values input from the first characteristic value predictor, and output the inserted result; and a first interpolator to interpolate the inserted result input from the first expander, and output the interpolated result as the first predictive characteristic signal to the first receiver.

3. The signal receiving apparatus as claimed claim 1, wherein the characteristic of the channel corresponds to amplitude.

4. The signal receiving apparatus as claimed claim 1, wherein the characteristic of the channel corresponds to phase.

5. The signal receiving apparatus as claimed claim 1, wherein the characteristic of the channel corresponds to amplitude and phase.

6. The signal receiving apparatus as claimed claim 1, wherein the first channel characteristic estimator estimates the delay characteristic of the channel using Least Mean Square (LMS) method.

7. The signal receiving apparatus as claimed claim 1, wherein the first channel characteristic estimator estimates the delay characteristic of the channel using Recursive Least Square (RLS) method.

8. The signal receiving apparatus as claimed claim 1, wherein the first channel characteristic estimator estimates the delay characteristic of the channel using Kalman method.

9. A method for receiving and restoring a transmitted signal in a signal receiving apparatus adapted for use with a time-variant channel, comprising:
   (a) estimating a first delay characteristic signal using a received signal and a restored transmitted signal;
   (b) decimating the estimated first delay characteristic signal, predicting characteristic values of the channel from the decimated result of the first delay characteristic signal and interpolating the predicted channel characteristic values to obtain a first predictive characteristic signal;
   (c) estimating a decision value from the first predictive characteristic signal and the received signal, and restoring the transmitted signal from the estimated decision value; and
   d) repeating (a) through (c) until an accurate restored transmitted signal is obtained.

10. The signal receiving method as claimed in claim 9, wherein (b) comprises:
   (b1) decimating the estimated first delay characteristic signal estimated at (a);
   (b2) predicting the characteristic values of the channel from the decimated result of the first delay characteristic signal;
   (b3) inserting a predetermined value between the predicted characteristic values; and
   (b4) interpolating the inserted result to obtain the first predictive characteristic signal, and proceeding to (c).

11. A signal receiving apparatus adapted for use with a time-variant channel, the signal receiving apparatus which receives, as a received signal, a signal transmitted through the channel with a time-varying characteristic and restores original user information from the received signal, comprising:
   a first decimator to decimate a restored transmitted signal and output the decimated result of the restored signal;
   a second decimator to decimate the received signal and output the decimated result of the received signal;
   a channel characteristic estimator to estimate a delay characteristic signal representing the delay characteristic of the channel from the decimated results input from the first and second decimators, and output the estimated delay characteristic signal;
   a channel characteristic predictor to predict characteristic values of the channel from the delay characteristic signal input from the channel characteristic estimator, interpolate the predicted channel characteristic values, and output the interpolated result of the channel characteristic values as a predictive characteristic signal representing the predicted characteristic of the channel; and
   a receiver to estimate a decision value from the predictive characteristic signal and the received signal, restore the transmitted signal from the estimated decision value, and output the restored transmitted signal to the first decimator,
   whereby the original user information is restored from the decision value.

12. The signal receiving apparatus as claimed in claim 11, wherein the channel characteristic predictor comprises:
   a characteristic value predictor to predict the characteristic values of the channel from the delay characteristic signal input from the channel characteristic estimator, and output the predicted channel characteristic values;
   an expander to insert a predetermined value between the predicted channel characteristic values input from the characteristic value predictor, and output the inserted result; and
   an interpolator to interpolate the inserted result input from the expander, and output the interpolated result as a predictive characteristic signal to the second receiver.

13. A method for receiving and restoring a transmitted signal in a signal receiving apparatus adapted for use with a time-variant channel, comprising:
   (a) decimating a restored transmitted signal and a received signal;
   (b) estimating a delay characteristic signal using the decimated results;
   (c) predicting characteristic values of the channel from the estimated delay characteristic signal and interpolating a predicted channel characteristic values to obtain a predictive characteristic signal;
   (d) estimating a decision value from the predictive characteristic signal and the received signal, and restoring the transmitted signal from the estimated decision value; and
   d) repeating (a) through (c) until an accurate restored transmitted signal is obtained.

14. The signal receiving method as claimed in claim 13, wherein (c) comprises:
   (c1) predicting characteristic values of the channel from the delay characteristic signal estimated in (b);
   (c2) inserting a predetermined value between the predicted characteristic values; and
   (c3) interpolating the inserted result to obtain the predictive characteristic signal, and proceeding to (d).

15. A signal receiving apparatus adapted for use with a time-variant channel, the signal receiving apparatus which receives, as a received signal, a signal transmitted through the channel with a time-varying characteristic and restores original user information from the received signal, comprising:
   a first transmitted signal regenerator to regenerate a transmitted signal restored from a restored user information and output the regenerated transmitted signal;
   a channel characteristic estimator to estimate a delay characteristic signal representing the delay characteristic of the channel from the regenerated transmitted signal input from the first transmitted signal regenerator and the received signal, and output the estimated delay characteristic signal;
   a channel characteristic predictor to decimate the delay characteristic signal input from the channel characteristic estimator, predict characteristic values of the channel from the decimated result of the delay characteristic signal, interpolate the predicted channel characteristic values, and output the interpolated result of the channel characteristic values as a predictive characteristic signal representing predicted characteristic of the channel;

a receiver to estimate a decision value from the predictive characteristic signal input from the channel characteristic predictor and the received signal and output the estimated decision value; and a first decoder to decode the estimated decision value input from the receiver and output the decoded result as the restored user information obtained by restoring the original user information to the first transmitted signal regenerator.

16. The signal receiving apparatus as claimed claim 15, wherein the channel characteristic predictor comprises:

a decimator to decimate the delay characteristic signal input from the channel characteristic estimator, and output the decimated result of the delay characteristic signal;

a characteristic value predictor to predict characteristic values of the channel from the decimated result of the delay characteristic signal input from the decimator, and output the predicted channel characteristic values;

an expander to insert a predetermined value between the predicted channel characteristic values input from the characteristic value predictor, and output the inserted result; and an interpolator to interpolate the inserted result input from the expander, and output the interpolated result as the predictive characteristic signal to the receiver.

17. A method for receiving and restoring a transmitted signal in a signal receiving apparatus adapted for use with a time-variant channel, comprising:

(a) regenerating a transmitted signal restored from a restored user information and obtaining a regenerated transmitted signal;

(b) estimating a delay characteristic signal using the regenerated transmitted signal and a received signal;

(c) decimating the estimated delay characteristic signal, predicting characteristic values of the channel from the decimated result of the delay characteristic signal, interpolating predicted channel characteristic values to obtain the predictive characteristic signal; (d) estimating a decision value from the predictive characteristic signal and the received signal;

(e) decoding the estimated decision value so as to obtain the restored user information; and (f) repeating (a) through (e) until an accurate restored transmitted signal is obtained.

18. The method as claimed in claim 17, wherein (c) comprises:

(c1) decimating the estimated delay characteristic signal estimated in (b);

(c2) predicting characteristic values of the channel from the decimated result of the delay characteristic signal;

(c3) inserting a predetermined value between predicted characteristic values; and (c4) interpolating the inserted result to obtain the predictive characteristic signal, and proceeding to (d).

19. A signal receiving apparatus adapted for use with a time-variant channel, the signal receiving apparatus which receives, as a received signal, a signal transmitted through the channel with a time-varying characteristic and restores original user information from the received signal, comprising:

a transmitted signal regenerator to regenerate a transmitted signal restored from restored user information and output the regenerated transmitted signal;

a first decimator to decimate the regenerated transmitted signal input from the transmitted signal regenerator and output the decimated result of the regenerated transmitted signal;

a second decimator to decimate the received signal and output the decimated result of the received signal;

a channel characteristic estimator to estimate a delay characteristic signal representing the delay characteristic of the channel from the decimated results input from the first and second decimators, and output the estimated delay characteristic signal;

a channel characteristic predictor to predict characteristic values of the channel from the delay characteristic signal input from the channel characteristic estimator, interpolate the predicted channel characteristic values, and output the interpolated result of the channel characteristic values as a predictive characteristic signal representing the predicted characteristic of the channel;

a receiver to estimate a decision value from the predictive characteristic signal and the received signal, and output the estimated decision value; and a decoder to decode the estimated decision value input from the receiver and output the decoded result as the restored user information obtained by restoring the original user information to the transmitted signal regenerator.

20. The signal receiving apparatus as claimed in claim 19, wherein the channel characteristic predictor comprises:

a characteristic value predictor to predict the characteristic values of the channel from the delay characteristic signal input from the channel characteristic estimator, and output the predicted channel characteristic values;

an expander to insert a predetermined value between the predicted channel characteristic values input from the characteristic value predictor, and output the inserted result; and an interpolator to interpolate the inserted result input from the expander, and output the interpolated result as the predictive characteristic signal to the receiver.

21. A method for receiving and restoring a transmitted signal in a signal receiving apparatus adapted for use with a time-variant channel, comprising:

(a) regenerating a transmitted signal restored from restored user information and obtaining a regenerated transmitted signal;

(b) decimating the regenerated transmitted signal and a received signal;

(c) estimating a delay characteristic signal using the decimated results;

(d) predicting a characteristic value of the channel from the estimated delay characteristic signal and interpolating a predicted channel characteristic value so as to obtain a predictive characteristic signal;

(e) estimating a decision value from the predictive characteristic signal and the received signal;

(f) decoding an estimated decision value so as to obtain the restored user information; and (g) repeating (a) through (f) until an accurate restored transmitted signal is obtained.

22. The signal receiving method as claimed in claim 21, wherein (d) comprises:

(d1) predicting the characteristic values of the channel from the delay characteristic signal estimated in (c);

(d2) inserting a predetermined value between the predicted characteristic values; and (d3) interpolating the inserted result to obtain the predictive characteristic signal, and proceeding to (e).

* * * * *